April 13, 1965  C. N. HUTCHISON ETAL  3,177,713
TEMPERATURE COMPENSATION FOR THREE CHAMBER METER
Filed March 6, 1963  3 Sheets-Sheet 3
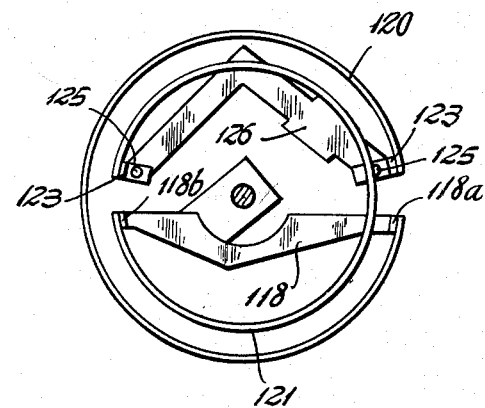
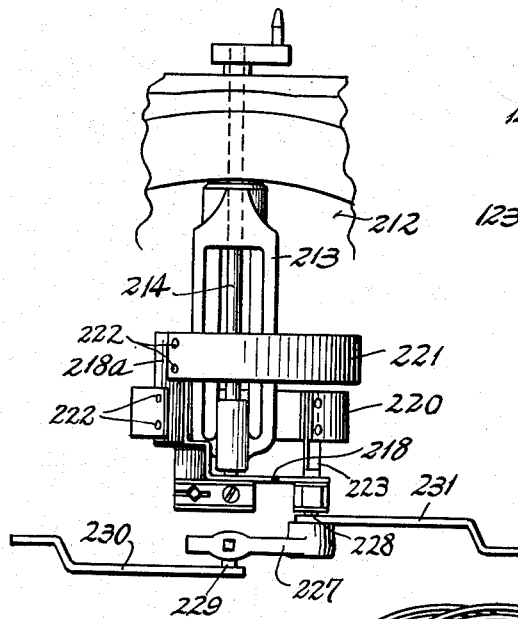
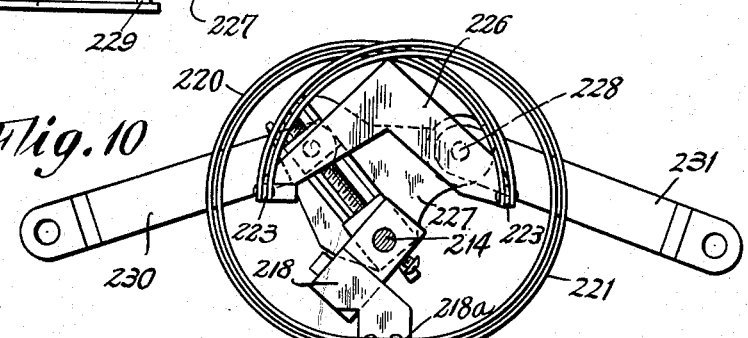
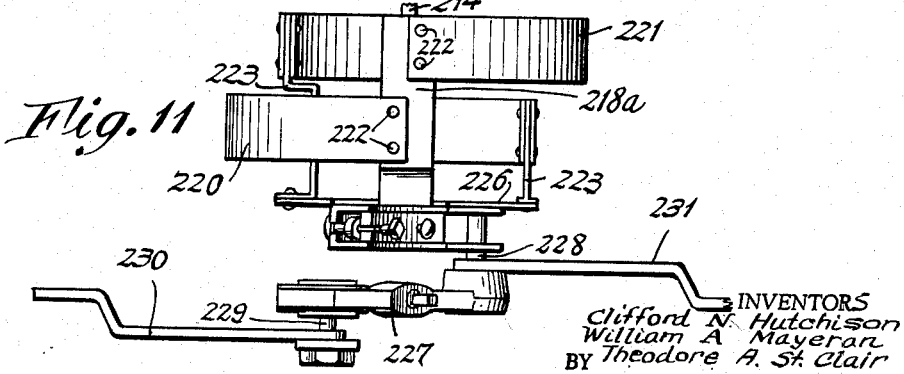
INVENTORS
Clifford N. Hutchison
William A. Mayeran
BY Theodore A. St. Clair
Johnson and Kline
ATTORNEYS

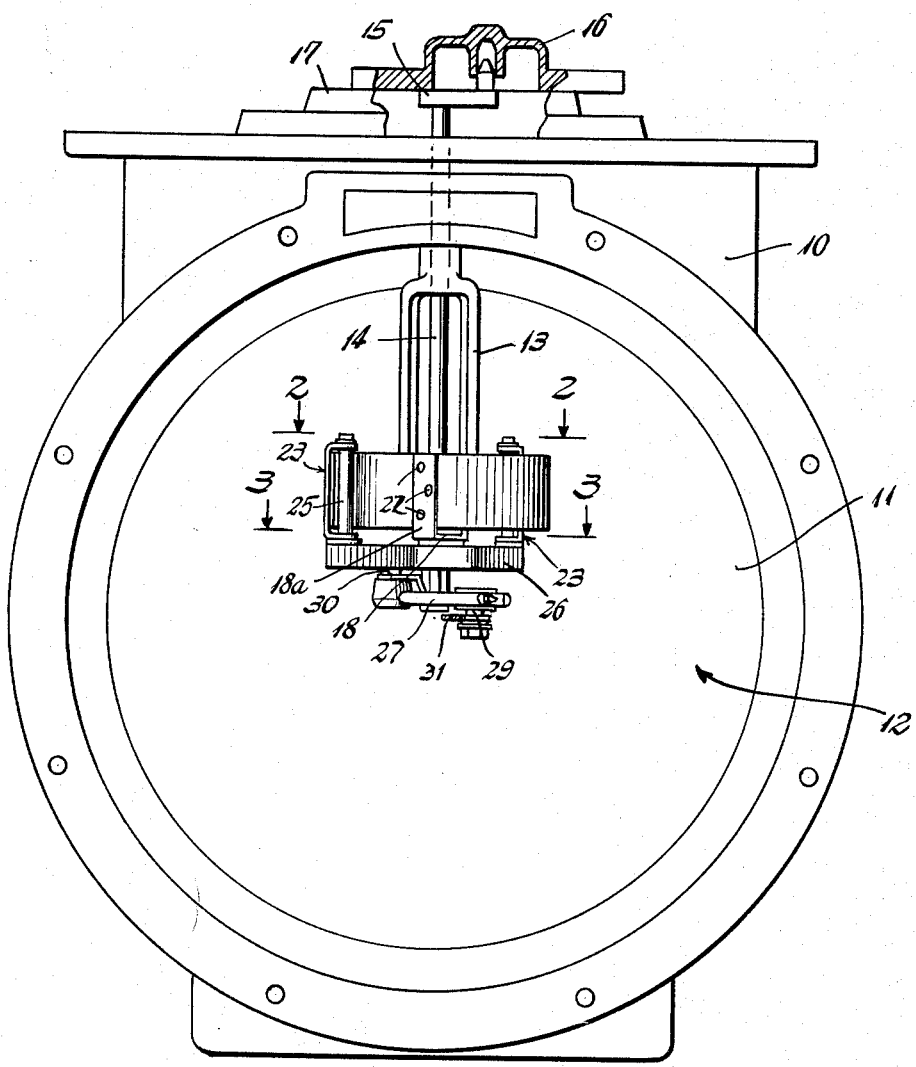

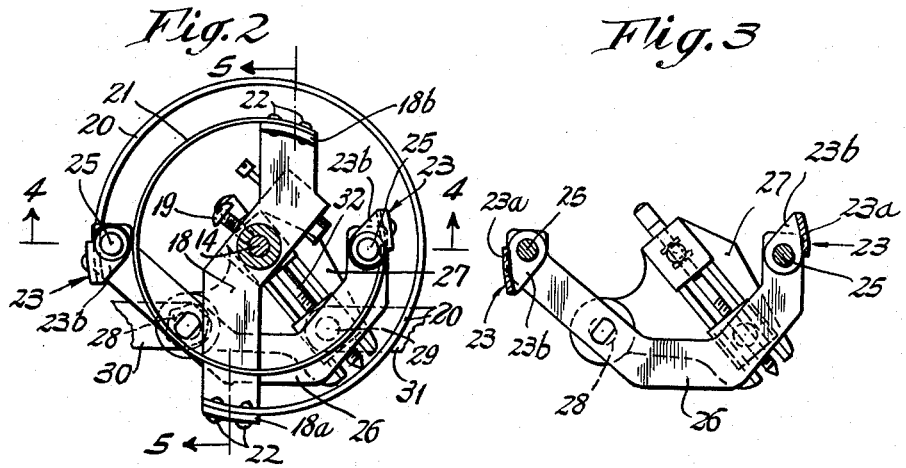
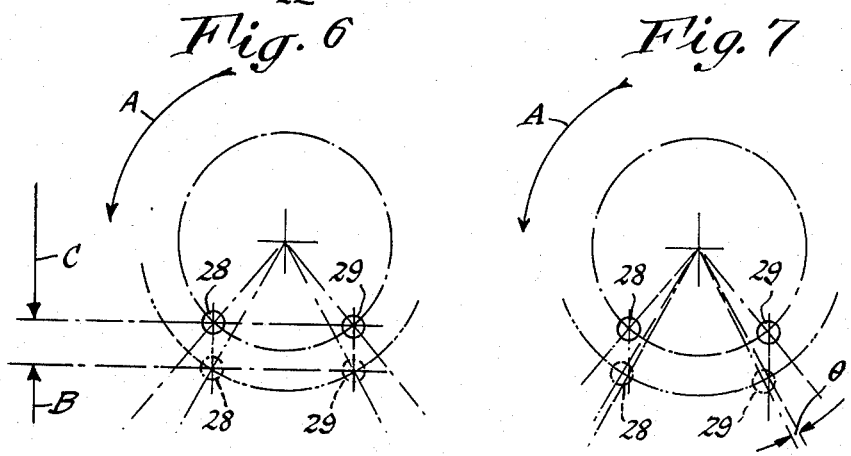
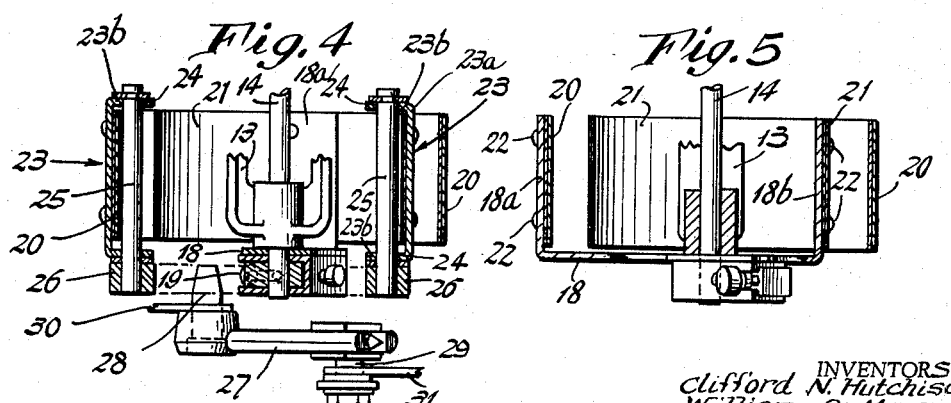

3,177,713
TEMPERATURE COMPENSATION FOR THREE CHAMBER METER

Clifford N. Hutchison, Stratford, William A. Mayeran, Bridgeport, and Theodore A. St. Clair, Fairfield, Conn., assignors to Textron Inc., Providence, R.I., a corporation of Rhode Island
Filed Mar. 6, 1963, Ser. No. 263,291
7 Claims. (Cl. 73—281)

This invention relates to temperature compensating means for a gas meter and more particularly for a three chamber gas meter.

Temperature compensation in gas meters is desired since the heating value of a gas is proportional to its density which is proportional to its absolute temperature. Thus the quantity of gas passed with respect to the index reading should be diminished at low temperatures and increased at elevated temperatures.

The problem of temperature compensation in three chamber gas meters is complicated due to the fact that the tangent links are not connected to a single tangent post or stud but are connected to separated posts. This arrangement complicates the modulation of the diaphragm stroke to compensate for temperature change since any mid-angle unidirectional movement of the posts changes the relative angle between them and their pivot point which affects the relationship between the valves and diaphragms and results in timing errors.

It is an object of the present invention to provide a simple temperature compensating means embodying a low hysteresis straight line travel actuator which varies the stroke of the diaphragm and hence the displacement to provide accurate volume correction in response to changes in temperature.

Another object of the invention is to provide means wherein there is a constant correction to valve timing as the displacement of the diaphragm is changed by the thermal action.

A still further object of the invention is to provide a rugged, compact compensator which requires a minimum of space.

These objects are accomplished by the present invention by providing a novel compensating means which is connected between the main shaft of the meter and the tangent flange for moving the tangent posts in substantially straight line movement toward or away from the plane passing through the axis of the main shaft.

Preferably, this is accomplished by bimetallic members which extend in circular paths for at least 270° and are arranged substantially concentric with the axis of the shaft.

If desired, the bimetallic members can also be arranged so as to provide not only a straight line movement, but a rotation of the compensating unit with respect to the axis of the shaft so as to automatically effect the timing change with the modulation of the diaphragm stroke.

Other features and advantages of the invention will be apparent from the specification and claims when considered in connection with the accompanying drawings in which:

FIGURE 1 is a view of a three chamber gas meter with one cover and diaphragm removed to expose the center chamber.

FIG. 2 is a view taken along line 2—2 of FIG. 1 showing the temperature compensator of one form of the invention.

FIG. 3 is a view taken along the line 3—3 of FIG. 1.

FIG. 4 is a sectional view taken along line 4—4 of FIG. 2.

FIG. 5 is a view taken along line 5—5 of FIG. 2.

FIG. 6 is a diagrammatic view showing the change in position of the tangent post due to temperature change.

FIG. 7 is a view similar to FIG. 6 showing the rotary displacement of the post to correct the timing in cooperation with the change of the diaphragm displacement.

FIG. 8 is a view showing another arrangement of bimetallic members in the temperature compensating means.

FIG. 9 is a fragmentary view similar to FIG. 1 showing a still further form of temperature compensating means.

FIG. 10 is a top view of the form of the invention shown in FIG. 9.

FIG. 11 is a side view of the device of FIG. 10.

As shown in the drawings, the present invention is applied to a standard three chamber meter having a central portion 10 to which the usual end caps (not shown) are secured, which end caps secure diaphragms 11 in position to extend across the opening in the central portion to form the three chambers including a central chamber 12 in the meter. The ceneral chamber has a bracket 13 for mounting a main shaft 14 which has its upper end connected to a valve actuator 15 for moving the valve cover 16 in conjunction with the valve seat 17. The other end of the main shaft has secured thereto a mounting bracket 18 for mounting the temperature compensating means.

In the form of the invention shown in FIGS. 1 to 5, the mounting bracket extends transversely of the axis of the shaft 14 and is secured thereto by a screw 19. The bracket has upstanding end parts 18a, 18b to which are secured one end of bimetallic members 20, 21 by rivets 22 or the like, as shown in FIG. 5.

The bimetal members 20, 21 extend in a substantially circular path through 270° and are preferably arranged substantially coaxial with the axis of the main shaft with their free ends located in a plane which would be parallel to a plane passing through the axis of the shaft 14 and disposed on opposite sides of a line perpendicular to said plane at the axis of the shaft. As shown in FIG. 4, each of the free ends has the base 23a of a U-shaped member 23 secured thereto with the legs 23b of the U provided with holes 24 to receive a pivot pin 25 carried by a lower bracket 26. Secured to the lower bracket to move therewith is a tangent adjustment flange 27 having tangent link studs or posts 28, 29 thereon in spaced relation to receive the diaphragm operated tangent links 30, 31 and pivotally mount them thereon so that the tangent studs or posts when driven by the links move in circular paths in the direction of arrow A about the axis of the main shaft 14, as shown by the dot and dash lines of FIG. 6. As shown, stud 28 is fixed to the flange and stud 29 is adjustable thereon by the usual threaded displacement adjusting means 32.

The bimetal members of this form of the invention are nested, as shown in FIG. 2, and are so constructed that the outer bimetal has its lower activity on the inside and closes upon heating and the smaller bimetal has its lower activity on the outside and, therefore, opens upon heating.

The basic formula for bimetal movement in a configuration such as this is:

$$\frac{d}{t} = \frac{K_1 K_2 R^2}{t}$$

where:
$d$ = deflection
$T$ = Fahrenheit temperature difference
$K_1$ = coefficient for the configuration
$K_2$ = coefficient of bimetal activity
$t$ = thickness of material
$R$ = radius of formed circle From the above it can be seen that the material thickness is directly proportional to the square of the radius and that for balanced movement, the thickness of the inner bimetal must be less than the outer, since its length is obviously less.

With this relationship it will be seen that the studs will move in a direction of arrow B for decreases in temperature and in the direction of arrow C for increases in temperature along lines perpendicular to the plane passing through the main shaft. This will be clear from the showing of FIGS. 6 and 7. This movement will cause the modulation of the diaphragm stroke to compensate for the changes in volume with respect to change in temperature.

While this straight line movement is satisfactory for some meters which have low flow rates and are not subjected to high or low temperature variations, it has been discovered that it has introduced slight inaccuracies where the meter is subjected to high or low temperatures. These conditions can be overcome manually by adjusting the relationship of the diaphragms and valves. However, this correction can be done automatically by providing excess activity in the smaller bimetal so that not only is there a movement of the tangent posts toward and away from the plane of the main shaft but the tangent flange is given a slightly rotative movement about the axis of the main shaft, as indicated by the angle $\theta$ in FIG. 7, which produces an automatic change in timing of the meter to compensate for these variations.

While the bimetal elements in the form of the invention shown in FIGS. 1–7 extend through substantially 270°, it is to be understood that the bimetals can extend through ranges other than this specific relation so long as they produce the same uniform movement toward and away from the plane passing through the axis of the main shaft. For example, FIG. 8 shows an arrangement of bimetals which can be used in the form of the invention of FIG. 1 in which the bimetals extend through substantially 345°.

As shown in the drawings, the bimetal 120 has its end fixed to a mounting portion 118a of a mounting bracket 118 adapted to be secured to the main shaft of the meter and its other end connected to a pivot bracket 123 mounted on a pivot pin 125 carried by one end of the lower bracket 126 adapted to be connected to the tangent flange. The other bimetal 121 has its fixed end secured to the portion 118b of the bracket 118 and its other end connected to the pivot bracket 123 mounted on the pivot 125 carried by the other end of the lower bracket 126. The bracket 118 can be secured to the main shaft and the bracket 126 can be secured to the tangent flange in the manner above noted in connection with the brackets 18 and 26.

In the form of the invention shown in FIG. 9, a different type of bimetal construction is employed. In this form of the invention the main shaft 214 is mounted in the central chamber 212 by a bracket 213. Secured to the end of the shaft is a mounting bracket 218 having a vertical portion 218a. The two bimetal units 220 and 221 in this form of the invention are formed by a pair of separate metallic members, as shown in FIG. 10. The two members have their ends positioned on either side of the vertical bracket 218a and are secured thereto by rivets 222. It will be noted that the bimetal units are disposed in parallel planes extending transversely of the axis of the main shaft 214 and each bimetal unit extends through a circular path of approximately 270°. The other end of the bimetal unit 220 is fastened on an upstanding bracket 223 on one end of a lower bracket 226. The other end of the bimetal unit is secured to the vertical bracket 223 at the other end of the lower bracket 226. It will be noted that the ends of the bimetal units are disposed on opposite sides of the brackets 223 and are secured in place by rivets or the like. The lower bracket is connected to the tangent adjustment flange 227 which carries the tangent link posts or studs 228, 229 cooperating with the tangent links 230, 231. The bimetals are selected so that as they expand and contract they will move the tangent posts or studs toward or away from the plane passing through the axis of the main shaft in the manner described above.

Variations and modifications may be made within the scope of the claims and portions of the improvements may be used without others.

We claim:

1. Temperature compensating means for a three chamber gas meter for modulating the diaphragm strokes thereof to compensate for temperature changes, said meter having a center chamber and means rotatably mounting a main shaft therein, comprising a mounting bracket secured to the main shaft, a pair of oppositely extending bimetal member extending around the axis of said main shaft, each having one end fixed to said bracket with the other ends free to move in response to temperature variations, the free ends of the bimetallic members being located in a plane and on opposite sides of a line perpendicular to a plane passing through the main shaft, said bimetallic members having the elements thereof arranged so that the free ends are movable in the same direction toward or away from the plane of the main shaft in response to variation in temperature, and means connecting a tangent adjustment flange to said free ends of the bimetallic members for movement therewith, said flange having tangent link studs mounted thereon and rotatably carrying diaphragm connected links, said studs moving in predetermined circular paths about the main shaft as determined by the position of the free ends and modulating the diaphragm strokes in accordance with temperature variations.

2. Temperature compensating means for a three chamber gas meter having a means in the center chamber rotatably mounting a main valve operating shaft comprising a mounting bracket secured to the shaft and having the ends thereof disposed on opposite sides of said shaft, a pair of oppositely extending bimetal members, each having one end fixed to an end of said bracket with the other ends free to move in response to temperature variations, and means connecting a tangent adjustment flange to said free ends for movement thereby and having a pair of tangent link studs connected to diaphragm operated links mounted thereon and movable in a predetermined circular path, the free ends of the bimetallic members being located in a plane and on opposite sides of a line perpendicular to a plane passing through the axis of the main shaft, said bimetallic members having the elements thereof arranged so that the free ends connected to the flange move the studs in the same direction toward or away from the plane of the main shaft and are adapted to modulate the diaphragm strokes to compensate for temperature changes and rotate the position of said studs relative to the axis of the main shaft whereby the timing of the valve is altered in conjunction with said modulation.

3. Temperature compensating means for a three chamber gas meter for modulating the diaphragm strokes thereof to compensate for temperature changes, said meter having a center chamber and means rotatably mounting a main shaft therein, comprising a mounting bracket secured to the main shaft, a pair of oppositely extending, substantially circular bimetal members extending for at least 270° around the axis of said main shaft, each having one end fixed to said bracket with the other ends free to move in response to temperature variations, the free ends of the bimetallic members being located in a plane and on opposite sides of a line perpendicular to a plane passing through the main shaft, said bimetallic members having the elements thereof arranged so that the free ends are movable in the same direction toward or away from said plane of the main shaft in response to variation in temperature, a lower bracket disposed below the mounting bracket and having means adjacent the ends thereof connected to the free ends of the bimetal members to be moved thereby, and a tangent adjustment flange connected to said lower bracket for movement therewith and having tangent link studs mounted thereon to move in predetermined circular paths about the main shaft determined by the position of the lower bracket.

4. Temperature compensating means for a three chamber gas meter for modulating the diaphragm strokes thereof to compensate for temperature changes, said meter having a center chamber and means rotatably mounting a main shaft in said center chamber to be driven by diaphragm operated tangent links, said compensating means comprising a mounting bracket secured to the main shaft and having the ends thereof disposed on opposite sides of said shaft, a pair of oppositely extending bimetal means concentric with the axis of said shaft, each having one end fixed to an end of said bracket with the other ends free to move in response to temperature variations and having pivot brackets thereon, the free ends of the bimetallic means being located in a plane and on opposite sides of a line perpendicular to a plane passing through the main shaft, said bimetallic means having the elements thereof arranged so that the ends are movable in the same direction toward or away from said plane passing through the main shaft, a lower bracket disposed below the mounting bracket and having pivot means adjacent the ends thereof rotatable in said pivot brackets to move the lower bracket in response to movement of said free ends of the bimetal means, and a tangent adjustment flange connected to said lower bracket for movement therewith and having a pair of tangent link studs mounted thereon in predetermined relation to move in circular paths about the main shaft determined by the position of the lower bracket.

5. Temperature compensating means for a three chamber gas meter for modulating the diaphragm strokes thereof to compensate for temperature changes, said meter having a center chamber and means rotatably mounting a main shaft in said center chamber to be driven by diaphragm operated tangent links, said compensating means comprising a mounting bracket secured to the main shaft and having the ends thereof disposed on opposite sides of said shaft, a pair of nested, concentric bimetallic members, each extending for substantially 270° in opposite directions and having one end fixed to an end of said bracket with the other ends free to move in response to temperature variations and having pivot brackets thereon, the free ends of the bimetallic members being located in a plane and on opposite sides of a line perpendicular to the plane passing through the main shaft, said bimetallic members having the elements thereof arranged so that the ends are movable in the same direction toward or away from the plane passing through the main shaft, a lower bracket disposed below the mounting bracket and having pivot means adjacent the ends thereof rotatable in said pivot brackets to move the lower bracket in response to movement of said free ends of the bimetallic members, and a tangent adjustment flange connected to said lower bracket for movement therewith and having a pair of tangent link studs mounted thereon in predetermined relation to move in circular paths about the main shaft controlled by the position of the lower bracket as determined by the operation of the bimetallic members.

6. Temperature compensating means for a three chamber gas meter for modulating the diaphragm strokes thereof to compensate for temperature changes, said meter having a center chamber and means rotatably mounting a main shaft in said center chamber to be driven by diaphragm operated tangent links, said compensating means comprising a mounting bracket secured to the main shaft and having the ends thereof disposed on opposite sides of said shaft, a pair of oppositely extending nested concentric bimetallic members, each extending for slightly less than 360° and having one end fixed to an end of said bracket with the other ends free to move in response to temperature variations and having pivot brackets thereon, the free ends of the bimetallic members being located in a plane parallel to a plane passing through the axis of the main shaft and on opposite sides of a line perpendicular to said plane passing through the main shaft, said bimetallic members having the elements thereof arranged so that the ends are movable in the same direction toward or away from the plane passing through the main shaft, a lower bracket disposed below the mounting bracket and having pivot means adjacent the ends thereof rotatable in said pivot brackets to move the lower bracket in response to moveemnt of said free ends of the bimetallic members, and a tangent adjustment flange connected to said lower bracket for movement therewith and having a pair of tangent link studs mounted thereon in predetermined relation to move in circular paths about the main shaft controlled by the position of the lower bracket as determined by the operation of the bimetallic members.

7. Temperature compensating means for a three chamber gas meter for modulating the diaphragm strokes thereof to compensate for temperature changes, said meter having a center chamber and means rotatably mounting a main shaft in said center chamber to be driven by diaphragm operated tangent links, said compensating means comprising a mounting bracket secured to the main shaft, a pair of oppositely extending concentric bimetal members located in parallel planes, each extending through substantially 270° and having one end fixed to said bracket and disposed in spaced relation to one side of the main shaft with the other ends free to move in response to temperature variations, the free ends of the bimetallic members being located on the other side of the main shaft and in a plane parallel to a plane passing through the main shaft and on opposite sides of a line perpendicular to the plane passing through the main shaft with the ends movable in the same direction in response to temperature change toward or away from the plane passing through the main shaft, a lower bracket disposed below the mounting bracket provided with means connected to the free ends of said bimetallic members to be moved thereby in response to movement of said free ends of the bimetal members, and a tangent adjustment flange connected to said lower bracket for movement therewith and having a pair of tangent link studs mounted thereon in predetermined relation to move in circular paths about the main shaft controlled by the position of the lower bracket.

References Cited by the Examiner
UNITED STATES PATENTS

| | | | |
|---|---|---|---|
| 2,339,956 | 1/44 | Sillers | 73—281 |
| 2,778,224 | 1/57 | Douglas | 73—281 |
| 2,912,859 | 11/59 | Douglas | 73—281 |
| 3,119,264 | 1/64 | St. Clair | 73—281 |

RICHARD C. QUEISSER, *Primary Examiner.*

DAVID SCHONBERG, *Examiner.*